United States Patent [19]

Sato et al.

[11] Patent Number: 4,718,053
[45] Date of Patent: Jan. 5, 1988

[54] OPTICAL INFORMATION APPARATUS AND METHOD OF RECORDING AND ERASING INFORMATION

[75] Inventors: Yoshio Sato; Satoshai Shimada; Hiroshi Sasaki; Norifumi Miyamoto, all of Hitachi; Nobuyoshi Tsuboi, Ibaraki; Hideki Nihei, Hitachi; Ryuji Watanabe, Ibaraki; Atsumi Watanabe, Hitachi; Tetsuo Ito, Mito; Hiroaki Koyanagi, Hitachi, all of Japan

[73] Assignee: Hitachi, Ltd., Tokyo, Japan

[21] Appl. No.: 795,313

[22] Filed: Nov. 6, 1985

[30] Foreign Application Priority Data

Nov. 9, 1984 [JP] Japan ............................ 59-234988
Dec. 3, 1984 [JP] Japan ............................ 59-255315
Dec. 3, 1984 [JP] Japan ............................ 59-255320
Dec. 3, 1984 [JP] Japan ............................ 59-255319

[51] Int. Cl.$^4$ .................... G11B 7/095; G11B 7/24
[52] U.S. Cl. .................................... 369/44; 369/100; 369/284; 369/286; 369/94; 346/76 L; 346/135.1
[58] Field of Search ................ 369/100, 111, 44, 275, 369/283, 284, 286, 288, 110, 94; 346/76 L, 137, 135.1

[56] References Cited

U.S. PATENT DOCUMENTS

| | | | |
|---|---|---|---|
| 3,530,441 | 9/1970 | Ovskinsky | 365/113 |
| 3,889,272 | 6/1975 | Lou | 346/76 L |
| 4,394,661 | 7/1983 | Peeters | 369/94 |
| 4,564,931 | 1/1986 | Ohara | 369/110 |
| 4,566,088 | 1/1986 | Yoshida | 369/111 |
| 4,578,788 | 3/1986 | Ahn | 369/275 |

Primary Examiner—Alan Faber
Attorney, Agent, or Firm—Antonelli, Terry, & Wands

[57] ABSTRACT

The present invention employs as a recording medium a metal or alloy which exhibits an intercrystalline transition before and after writing. In the present invention, two light beams of unequal wavelengths are used so as to write information with the light beam of the longer wavelength and to erase information with the light beam of the shorter wavelength. In changing a written content, a wavelength with which the reflection rate of the recording medium increases is used.

21 Claims, 24 Drawing Figures

HEATING AND COOLING PROCESS

FIG. 1 PRIOR ART
FIG. 2
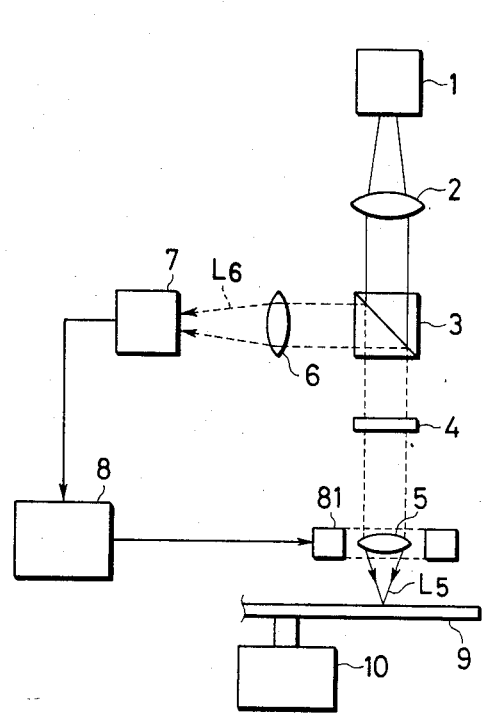
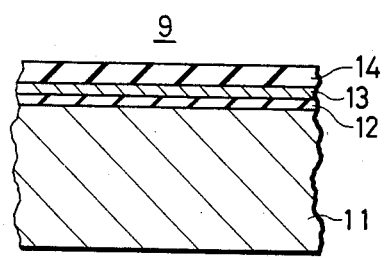
FIG. 3
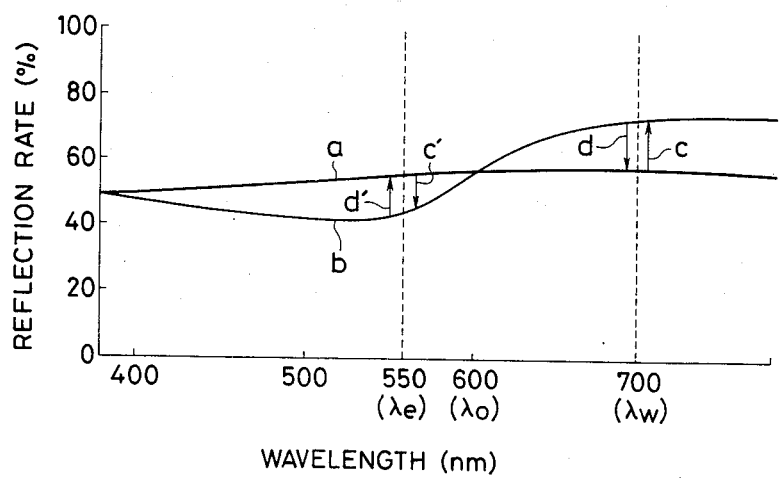

HEATING AND COOLING PROCESS

TIME

OPTICAL INFORMATION APPARATUS AND METHOD OF RECORDING AND ERASING INFORMATION

FIELD OF THE INVENTION

The present invention relates to an optical information apparatus for recording and reproducing large quantities of information and a method of recording and erasing the information, and more particularly to an optical disc device well-suited for use as a memory requiring rewriting and a recording and erasing method therefor.

BACKGROUND OF THE INVENTION

An apparatus which records information on a recording medium at high density and reproduces it by the use of a laser beam condensed to the submicron order, can record large capacities of information such as images and sounds and is expected to become an apparatus indispensable to the future information-oriented society. Such an optical recording and reproducing apparatus is, for example, an optical disc device. The optical disc devices include three types; (1) the reproduce-only type, (2) the add-on type and (3) the rewritable type, and the reproduce-only type and the add-on type have substantially reached practical stages.

On the other hand, the so-called rewritable type capable of readily erasing information recorded once and recording new information does not have an established method yet. Therefore, developments are being actively promoted for optical recording and reproducing apparatuses capable of recording, reproduction and erasure with the same extent of ease as that of tape recorders.

A recording medium which can accomplish this theme is, for example, one employing an amorphous semiconductor as a recording material as described in U.S. Pat. No. 3,530,441 entitled "Method and Apparatus for storing and retrieving information" issued on Sept. 22, 1970. However, an amorphous state cannot be said an essentially stable state and exhibits a trend toward crystallization when let stand, and it has not been suitable for a memory over a long term.

SUMMARY OF THE INVENTION

An object of the present invention is to use a novel substance which does not become an amorphous state, for a recording medium, and to provide an optical information apparatus suited to the novel recording medium and a recording and erasing method therefor.

The novel recording medium of the present invention is made of a metal or alloy which perfroms a crystal-crystal transition before and after recording (hereinbelow, simply termed 'intercrystalline transition alloy'). Two beams of unequal wavelengths are employed, and the beam of the longer wavelength is used for the recording and that of the shorter wavelength for erasing so as to increase a reflection rate in altering a recorded content.

BRIEF DESCRIPTION OF THE DRAWINGS

FIG. 1 shows a general arrangement diagram of an optical system in a prior-art optical disc device.

FIG. 2 shows a view of one example of construction of a disc for use in the present invention.

FIG. 3 is a diagram of an example of typical characteristics of a recording medium for use in the present invention.

DETAILED DESCRIPTION OF THE PREFERRED EMBODIMENTS

Figure 4:
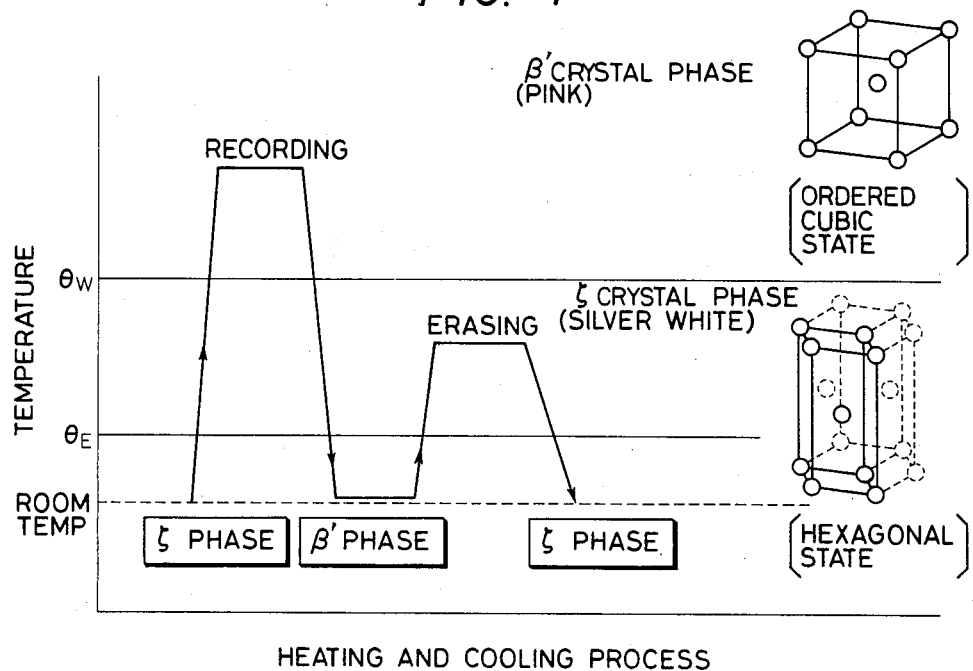
FIG. 4 is a diagram for explaining the information recording and erasing principles of a recording medium for use in the present invention.

FIG. 1 shows the general arrangement of the optical system of a prior-art optical disc device. The symbols and operations of various portions in the figure will now be described. Numeral 1 designates a laser diode which serves as a light source. Numeral 2 designates a collimation lens, which turns the light beam of the laser diode 1 into a collimated beam. Shown at numeral 3 is a polarizing beam splitter (hereinbelow, abbreviated to 'PBS'), which transmits the output beam of the collimation lens therethrough and which refracts retrogressive light from a λ/4 plate indicated by numeral 4 to be stated next. The λ/4 plate 4 is used for the phase polarization of light in order to facilitate the discrimination between the input light and reflected light in the PBS 3. Numeral 5 indicates an objective, which is used for condensing input light. Numeral 6 indicates a coupling lens, which receives a beam from the PBS 3 and condenses it. The coupling lens 6 is composed of two semicylindrical lenses which are crossed. Shown at numeral 7 is a photosensor. The photosensor 7 senses the shape of the light spot of input light L6 from the coupling lens 6, thereby to indirectly sense the shape of the light spot of output light L5 from the objective 5. Numeral 8 denotes an actuator, which adjusts the focal position of the output light L5 of the objective 5 in accordance with the output of the photosensor 7. Shown at numeral 81 is a lens driving unit, which adjusts the position of the objective 5 in accordance with a drive control output from the actuator 8. Numeral 9 denotes a disc which can optically record, reproduce and erase information by way of example and which is partly illustrated. The disc 9 is capable of the recording, reproduction, erasing etc. in such a way that the output light L5 from the objective 5 projects a desired light spot on the surface of the disc. Numeral 10 denotes a motor, by which the disc 9 is driven.

An example of construction of the recording medium or disc 9 for use in the present invention will be described with reference to FIG. 2.

FIG. 2 illustrates a case where a single recording layer is included. Here, numeral 11 designates a reinforcement plate or plastic substrate 1.2–1.5 mm thick, which has the characteristics and functions described above and which is made of, for example, a polycarbonate, epoxy or polymethyl methacrylate resin. Numeral 12 designates a heat absorbing layer which is formed by evaporating a metal Bi or Cr or an oxide thereof or the like on the substrate to a thickness of several tens nm and which converts optical energy from the laser beam into thermal energy and transmits the latter to a color tone recording alloy layer 13 adjoining it. As the material of the layer 12, a semiconductor material such as Ge, Si or SiC can be employed, and a heat-resisting resin such as polyimide or polyamide may well be employed. The color tone recording alloy layer 13 is formed by evaporating, for example, Ag–40% Zn or Ag–35% Zn–1% Ga on the heat absorbing layer 12 to a thickness of about 50 nm, and it is irradiated with the laser beam from the side of the substrate 11. The optical energy of this laser beam is converted into thermal energy by the heat absorbing layer 12 and the recording layer 13. In this regard, since the surface reflection rate of the recording layer 13 is as great as 50%–80%, the function of absorbing heat in the heat absorbing layer 12 is important especially for the color tone recording with the Ag–40% Zn alloy. As illustrated in FIG. 3 to be referred to later, the Ag–Zn recording alloy thus heated exhibits reflection rates as indicated by a curve b when heated to 300° C. by way of example and demonstrates reflection rates as indicated by a curve a through a heating process of 300° C.→150° C. This is a phenomenon which arises on the basis of the phase transformation between the body-centered cubic crystal and hexagonal close-packed crystal of the Ag–Zn alloy as understood from FIG. 4 to be referred to later, and which is very stable and highly reproducible. Numeral 14 denotes a layer which is formed by the spin coating of a heat-resisting resin such as polyamide or polyamide or the sputtering or evaporation of a heat-resisting inorganic substance such as $Ta_2O_5$ to a thickness of several hundred nm–several μm, and which protects the surface of the recording layer 13 mechanically. In order to prevent the thermal diffusion in the horizontal direction, the layer 14 should desirably have a low thermal diffusivity. Alumina or glass may well be sputtered from the viewpoint of attaching importance to the heat resistance, but consideration is required for sufficiently thinning a film which withstands a stress attributed to the difference of thermal expansions. Anyway, the recording medium undergoes a heat cycle between 300° C. and the room temperature in a writing mode, so that the durability thereof is raised by contrivances such as making the thermal expansions of the respective layers close and thinning the films.

The embodiment of the present invention shown in FIG. 2 is basically put into the multilayer film structure which increases the absorption of laser power into the color tone recording alloy and which prevents thermal dissipation, and the individual materials shall have the following properties:

(1) The Ag–Zn system color tone recording alloy has a comparatively great reflection rate in itself. The reflection rate demonstrates a variation as shown in FIG. 3 through a process of heating to about 300° C. and rapid cooling, and is restored through a gradual cooling process. The thermal conductivity of the recording alloy is as great as 0.05–0.5 [cal/cm.° C..s], and the thermal expansivity is approximately $25 \times 10^{-6}[° C.^{-1}]$ which is comparatively great as a metal (the second layer).

(2) In order to reinforce the recording alloy film and to promote heat absorption and heat accumulation in the recording film, the plastic plate being the substrate has a high permeability for the wavelength of the laser beam as a rewriting light source, a low thermal conductivity for the rewriting light source, a low thermal conductivity for the purpose of preventing thermal dissipation and a heat resistance enough to avoid the deterioration thereof at a writing temperature.

(3) The first layer being the heat absorbing layer is made of a material which has heat absorbing, heat accumulating and heat resisting properties for efficiently converting the energy of the laser beam into thermal energy and efficiently transmitting the latter to the second layer and whose thermal conductivity is low in order to prevent the dissipation of heat in the horizontal direction.

(4) The third layer being the heat-resisting layer is made of a material of high strength for affording the function of mechanically protecting the second layer, and it has the function of preventing the horizontal diffusion of the thermal energy absorbed in the second layer and the function of receiving that magnitude of heat radiation from above which governs the response of an erasing mode.

According to the embodiment of the present invention shown in FIG. 2, the following advantages are brought forth:

(1) An optical recording disc of the type capable of writing and erasure can be fabricated using an optical recording alloy such as Ag–Zn which is a material doing no harm to man and beast.

(2) Owing to the multilayer film construction of the present structure, the effective utilization of writing power can be achieved.

(3) Plastic which is less expensive than glass etc. is employed as the substrate material, and a process permitting mass production can be adopted as a film forming process, which is economical.

Here, what the optical recording alloy layer 13 shown in FIG. 2 is like will be described as to an alloy composition, a non-bulky material and a method of producing it, a structure, characteristics, and applications.

(Alloy Composition)

The intercrystalline transition alloy of the present invention has different crystal structures in high temperature and low temperature states, and the quenched crystal structure thereof is formed by quenching from a high temperature. Further, the phase formed by the quenching is changed into the crystal structure in the low temperature state by heating at a predetermined temperature. A value of at least $10^{2°}$ C./second or at least $10^{3°}$ C./second is preferable as a cooling rate for obtaining the crystal structure different from that at the low temperature by means of the quenching from the high temperature in this manner.

The intercrystalline transition alloy of the present invention should preferably be an alloy which is composed of at least one of the group-Ib elements of the periodic table and at least one element selected from among the group-IIb, group-IIIb, group-IVb and group-Vb elements. Among such alloys, alloys whose principal components are copper and which contain Al, Ga, In, Ge and Sn are favorable, and these alloys which further contain Ni, Mn, Fe and Cr as third elements are favorable.

Also, alloys whose principal components are silver and which contain Al, Cd and Zn are favorable, and these alloys which further contain Cu, Al and Au as third elements are favorable.

An alloy whose principal component is gold and which contains Al is favorable.

The alloy of the present invention should preferably have an intermetallic compound which consists of the group-Ib element and the group-IIb, group-IIIb, group-IVb or group-Vb element mentioned above.

(Non-bulky Material and Method of Producing the Same)

In order to attain the variability of a reflection rate, the intercrystalline transition alloy of the present invention needs to form an overcooled phase through the heating and quenching of the material. A non-bulky material of small heat capacity which exhibits rapid heating and rapid cooling effects is desirable for preparing and storing information at high speed. More specifically, desirable is a non-bulky material having a volume with which substantially only a part of desired area can be changed into a crystal structure different from a reference crystal structure over the whole depth thereof by energy thrown into the desired minute area. Thus, a foil, a film, fine wire, powder or the like which is the non-bulky material of small heat capacity is desirable for preparing a high density of information with desired minute areas. A film thickness of 0.01–0.2 $\mu$m is recommended for the preparation of information with minute areas which realize a recording density of or above 20 megabits/cm². In general, an intermetallic compound is difficult of plastic working. As a technique for producing the foil, film, fine wire or powder, accordingly, it is effective that the material is quenched and solidified directly from a vapor phase or liquid phase into a predetermined shape. Such methods are PVD (such as evaporation or sputtering), CVD, a molten metal quenching method wherein a molten metal is poured onto the peripheral surface of a member of high thermal conductivity rotating at high speed, especially a metal roll and is thus quenched and solidified, electroplating, chemical plating, etc. In case of utilizing the film or the powdery material, it is effective to directly form it on a substrate or to bond it on a substrate by coating. When the coating is employed, a binder which does not cause a reaction etc. even by the heating of the powder is favourable. It is also effective for preventing the oxidation etc. of the material due to heating that the surface of the material or the surface of the film or coating layer formed on the substrate is coated.

The foil or the fine wire should preferably be formed by the molten metal quenching method, and should preferably have a thickness or diameter not greater than 0.1 mm. Especially for manufacturing a foil or fine wire of a crystal grain size not greater than 0.1 $\mu$m, a thickness or diameter not greater than 0.05 mm is favorable.

The powder should preferably be formed by an atomizing method wherein a molten metal is sprayed together with a gaseous or liquid coolant and is thrown into water to be quenched. The powder should preferably have a grain size not greater than 0.1 mm, and particularly an ultrafine powder having a grain size not greater than 1 $\mu$m is favorable.

As stated before, the film can be formed by evaporation, sputtering, CVD, electroplating, chemical plating, or the like. In particular, the sputtering is favorable for forming a film whose thickness is at most 0.1 $\mu$m. The sputtering can easily control an alloy composition aimed at.

(Structure)

The intercrystalline transition alloy of the present invention must have different crystal structures at a high temperature and a low temperature, and have a composition of an overcooled phase according to which the crystal structure at the high temperature is held at the low temperature by quenching from the high temperature. Favorable is an intermetallic compound which has a crystal structure of disordered lattice at the high temperature but whose overcooled phase has an ordered lattice of the Cs–Cl type or the DO$_3$ type by way of example. As a material which can greatly change an optical property, the alloy of the present invention should preferably be an alloy which principally forms this intermetallic compound, and especially a composition with which the whole alloy forms the intermetallic compound is favorable. The intermetallic compound is called an electron compound, and especially a material near the alloy composition of a 3/2 electron compound (the average outer-shell electron density e/a of which is 3/2) is favorable.

Besides, the intercrystalline transition alloy of the present invention should preferably have an alloy composition having a solid phase transformation, for example, eutectoid transformation or peritectoid transformation, and the alloy of the composition affords a great difference of spectral reflection rates through quenching and non-quenching from the high temperature.

The alloy of the present invention should preferably be an alloy having ultrafine crystal grains, and especially a crystal grain size not greater than 0.1 $\mu$m is favorable. That is, crystal grains should preferably be smaller than the values of the wavelengths of the visible radiation region and may well be smaller than the value of the wavelength of a semiconductor laser radiation.

(Characteristics)

The recording material of the present invention can form at least two sorts of spectral reflection rates in the visible radiation region at an identical temperature. That is, the spectral reflection rate of a state having the crystal structure formed by the quenching from the high temperature needs to differ from that of a state having the crystal structure formed by the non-quenching.

The difference of the spectral reflection rates to be attained by the quenching and the non-quenching should preferably be at least 5%, particularly at least 10%. When the difference of the spectral reflection rates is great, the discrimination of colors by vision is easy, which is remarkably effective in various applications to be described later.

As a radiation source for spectral reflection, an electromagnetic wave is usable even when it is other than the visible light, and infrared radiation, ultraviolet radiation, etc. are also usable.

As the other characteristics of the intercrystalline transition alloy of the present invention, the electric resistivity, the refractive index of light, the polarization factor of light, the permeability rate of light, etc. can be reversibly changed likewise to the spectral reflection rate, and they can be utilized for recording various information and reproducing recorded information.

Since the spectral reflection rate relates to the surface roughness state of the alloy, at least a desired part should preferably be a specular surface so as to afford the difference of or above 10% in at least the visible radiation region as described before.

(Applications)

The intercrystalline transition alloy of the present invention changes physical or electrical characteristics, such as a spectral reflection rate for an electromagnetic wave, an electric resistivity, a refractive index, a polarization factor and a permeability rate, partially or wholly on the basis of the change of crystal structures owing to heating and quenching, and it can be used for an information recording device by exploiting the changes of these characteristics.

As means for recording information, electric energies in the forms of a voltage and current or electromagnetic waves (visible light, radiant heat, infrared radiation, ultraviolet radiation, light from a photographic flash lamp, an electron beam, a proton beam, a laser beam from an argon laser, a semiconductor laser or the like, high-voltage spark discharge, etc.) can be employed, and it is particularly favorable that the alloy is applied to the recording medium of an optical disc by utilizing the change of spectral reflection rates based on the projection of any of the means. The optical discs include a digital audio disc (DAD or compact disc), a video disc, a memory disc, etc., to which the alloy is applicable. The alloy of the present invention can be used in disc devices of the reproduce-only type, the add-on type and the rewrite type by applying it to the recording media of the respective optical discs, and especially, it is very effective in the rewrite type disc device. A recording method may be either a method which applies energy intermittently in pulsing fashion, or a method which applies energy continuously. With the former, information can be recorded as digital signals.

The inventors conducted various experiments on the intercrystalline transition alloy of the present invention, and investigated how the reflection rates of light changed before and after recording, with the intention of applying it to an optical disc device. FIG. 3 shows a typical example of the investigation. In this figure, a represents the reflection rate before the recording, and b the reflection rate after the recording. The optical disc device exploits the characteristics, and using a light beam at a wavelength of 700 (nm) by way of example, it decides the presence or absence of information in accordance with the difference between the magnitude of reflection at the impingement of the light on a recorded place and the magnitude of reflection at the impingement of the light on an unrecorded place. As apparent from the figure, the reflection rate increases as indicated by c when recording information, and it decreases as indicated by d when erasing information. In contrast, in a case where a wavelength of 550 (nm) is selected, the reflection rate decreases as indicated by c' when recording information, and it increases as indicated by d' when erasing information.

Here will be described the information recording and erasing principles of the recording medium 13 according to the present invention. A recording layer with reversible phase changes has two transformation temperatures $\theta_W$ and $\theta_E$ as shown in FIG. 4. This figure elucidates an Ag-Zn alloy taken as an example. In this case, when the temperature of the Ag-Zn alloy is raised to or above the transformation temperature $\theta_W = 280°\text{-}300°$ C., a crystal of the body-centered cubic structure is formed, and when this crystal is rapidly cooled, the structure thereof is held as it is. On the other hand, when the temperature of the Ag-Zn alloy in the form of the crystal of the body-centered cubic structure is held between the transformation temperature $\theta_E = 100°\text{-}150°$ C. and $\theta_W = 280°\text{-}300°$ C., this crystal changes into a crystal of the close-packed hexagonal structure. This, information can be recorded or erased by utilizing the transition between the two crystals. While the above is the case of the single recording layer, the circumstances become as follows when the invention is applied to a case of two or more recording layers. Letting $\theta_{1W}$ and $\theta_{1E}$ denote the transformation temperatures of the first recording medium and $\theta_{2W}$ and $\theta_{2E}$ denote the tranformation temperatures of the second recording medium, the relations of the temperatures are considered to correspond to the six cases of (1) $\theta_{2W} > \theta_{2E} > \theta_{1W} > \theta_{1E}$, (2) $\theta_{2W} > \theta_{1W} > \theta_{2E} > \theta_{1E}$, (3) $\theta_{2W} > \theta_{1W} > \theta_{1E} > \theta_{2E}$, (4) $\theta_{1W} > \theta_{1E} > \theta_{2W} > \theta_{2E}$, (5) $\theta_{1W} > \theta_{2W} > \theta_{1E} > \theta_{2E}$ and (6) $\theta_{1W} > \theta_{2W} > \theta_{2E} > \theta_{1E}$. Since all the cases can be considered in the same way from the viewpoint of recording information, the case (1) will be exemplified here. In addition, the cases (1) and (4), those (2) and (5) and those (3) and (6) are considered in basically the same ways merely by changing the expressions "first" and "second".

Figure 5:
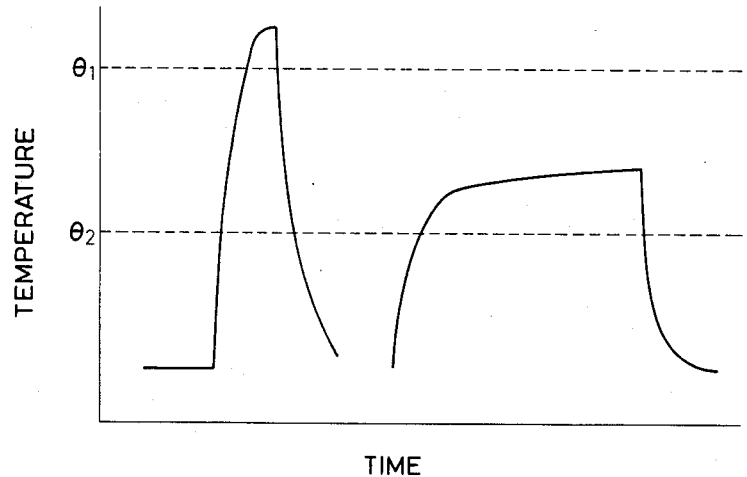
FIG. 5 is a diagram of an example of recording and erasing information on a recording medium for use in the present invention.

In order to record or erase information, the intercrystalline transition alloy must be heated to a temperature as indicated in FIG. 5. That is, when recording information, the recording medium needs to be heated to or above a temperature $\theta_1$ and thereafter cooled quickly, and when erasing information, the recording medium needs to receive a sufficient quantity of energy under the state of a temperature which is not lower than a value $\theta_2$ and which is lower than the value $\theta_1$.

Figure 6:
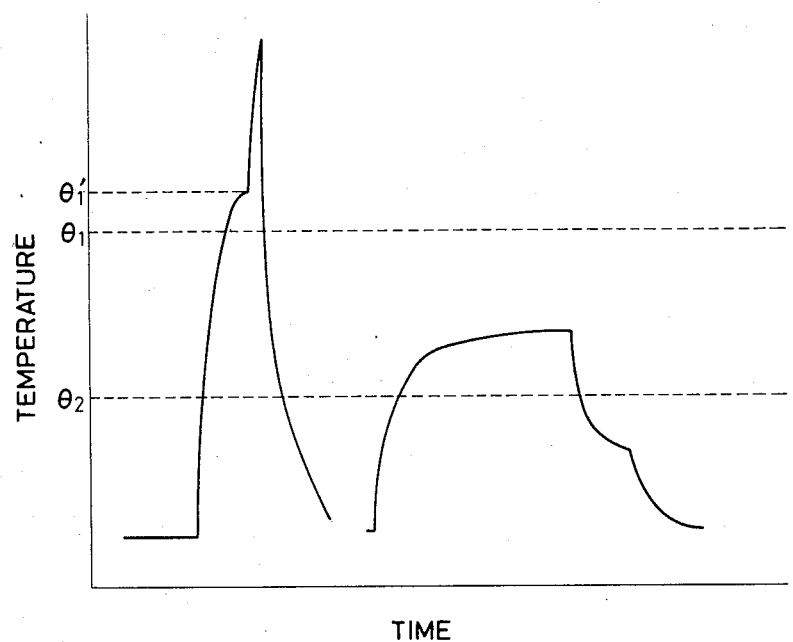
FIG. 6 is a temperature characteristic diagram in the case of recording and erasing information on a shorter wavelength side.

Since such relations need to be met for the recording and the erasing, the situation becomes as shown in FIG. 6 when the wavelength of 550 (nm) is used. More specifically, as regards the recording, it is not recommended to heat the recording medium more than is necessary. The optical disc is put into a multilayer construction for protection, support and other purposes, and it is preferable to avoid heating the optical disc unnecessarily from the standpoint of preventing deformation. Therefore, the light beam is controlled so as to heat the recording medium to a temperature $\theta_1'$ slightly higher than $\theta_1$. However, as soon as the recording has been done, the reflection rate lowers and the absorption rate increases (as will be described later, the intercrystalline transition alloy has a slight permeability rate because of a metal), so that the temperature rises suddenly to pose a problem as to the protection of the optical disc. Contrariwise, in the erasing mode, the reflection rate increases (the absorption rate decreases) upon completion of the erasing, so that the recording medium is suddenly cooled. This fact is favorable in itself, and poses no problem.

Figure 7:
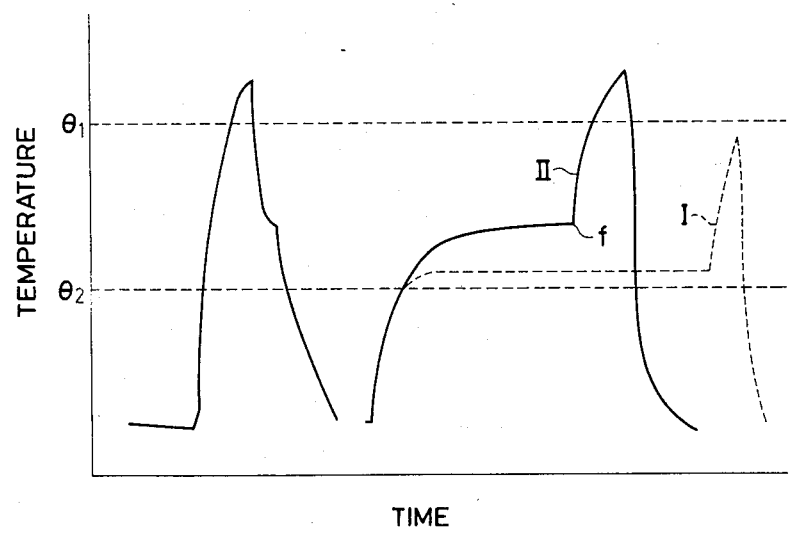
FIG. 7 is a temperature characteristic diagram in the case of recording and erasing information on a longer wavelength side.

Next, when the wavelength of 700 (nm) is used, it is feared that the erasing will be impossible as illustrated in FIG. 7. This problem is that, since the reflection rate lowers (the absorption rate increases) simultaneously with the completion (point f) of the erasing, the recording medium is rapidly heated as indicated by a pattern II, so the recording medium exceeds the lowest temperature $\theta_1$ for recording and is rewritten. The pattern II is more desirable than a pattern I in order to shorten the erasing period of time. That is, the erasing period of time becomes shorter as the temperature is higher. However, the higher temperature increases more the possibility of erroneous rewriting in the erasing mode, and inevitably high-speed erasing is impossible. In the recording mode, upon the completion of the recording, the reflection rate increases (the absorption rate decreases) to rapidly cool the recording medium, and this is rather favorable.

In the above description, the permeability rate of the intercrystalline transition alloy has been assumed small enough to be almost neglected, and this will be explained below.

Figure 8:
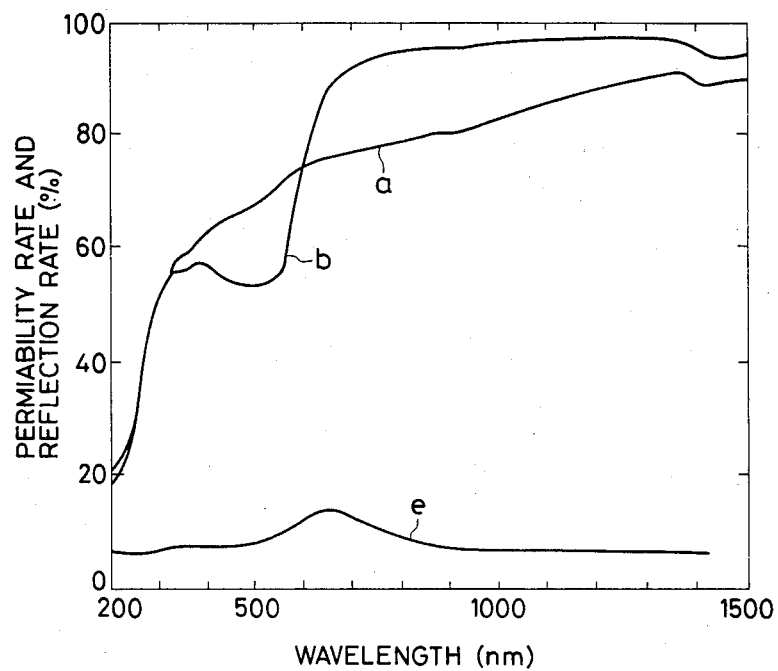
FIG. 8 is a diagram of reflection rate and permeability rate characteristics before and after recording at the time at which a recording film is thinned.

In general, a metal does not transmit light, but it comes to have a transmissivity for light when put into a thin film as in the present invention. FIG. 8 shows such characteristics. The characteristics in the figure illustrate reflection rates and a permeability rate in the case where Ag and 40 weight-% of Zn were evaporated by 60 nm on a glass substrate 1.2 mm thick by means of a sputtering equipment. A curve b in the figure indicates the reflection rate after recording, a curve a the reflection rate before the recording, and a curve e the permeability rate. As shown in the figure, the reflection rates exhibit different characteristics before and after the recording, whereas the permeability rates e are substantially equal and no significant difference is noted between them.

Meanwhile, the following relationship holds among the reflection rate R, the permeability rate T and the absorption rate A:

$$R + T + A = 100 (\%) \quad (1)$$

Here, when the state after the recording is expressed with a suffix b and the state before the recording is down with a suffix a, the relationship becomes:

$$Ra + Ta + Aa = 100 (\%) \quad (2)$$

$$Rb + Tb + Ab = 100 (\%) \quad (3)$$

On the other hand, as described before, the permeability rates Ta and Tb have the following relation:

$$Ta + Tb = T \quad (4)$$

Therefore, $Aa = 100 - T - Ra$ and $Ab = 100 - T - Rb$ hold, and the absorption rate A and the reflection rate R have a unique relation. That is, increase in the reflection rate indicates decrease in the absorption rate, and it can be said that the reflection and absorption rates do not depend on the permeability rate.

Figure 9:
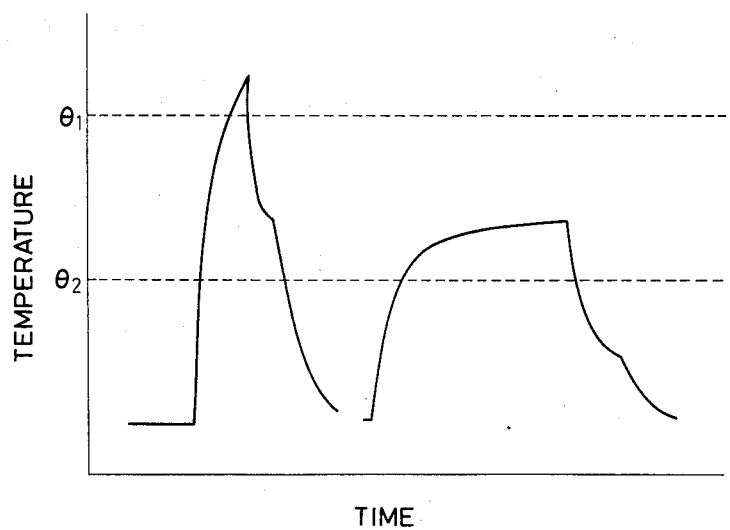
FIG. 9 is a temperature characteristic diagram of recording and erasing operations according to the present invention.

In the present invention, beams of two wavelengths are employed, and the wavelength $\lambda_w$ for writing (700 nm in the example of FIG. 3) is made longer than a wavelength $\lambda_o$ (600 nm in the example of FIG. 3) with which the reflection rates before and after the writing equalize, while the wavelength $\lambda_e$ for erasing (500 nm in the example of FIG. 3) is made shorter than the wavelength $\lambda_o$. Thus, the reflection rates shift in the direction of increasing (accordingly, the absorption rates shift in the direction of decreasing) in both the writing and erasing modes, and the recording medium is not heated unnecessarily. FIG. 9 shows how the temperature of the surface of the recording medium changes when the present invention is adopted. In the writing mode, upon completion of writing, the reflection rate increases (the absorption rate decreases), and the temperature lowers suddenly. Therefore, the overheating of the recording medium does not arise. Likewise, in the erasing mode, the temperature lowers upon completion of erasing, so that the recording medium is not subjected to rewriting. No erroneous rewriting permits the temperature of the surface of the recording medium in the erasing mode to come close to the recording temperature $\theta_1$, and signifies that high-speed erasing becomes possible.

As thus far described in detail, the two-wavelength system of the present invention must be such that the relation of the magnitudes of the reflection rates before and after recording reverses with the boundary at the wavelength $\lambda_o$ as elucidated with reference to FIG. 3, and most of the intercrystalline transition alloys mentioned before can be used.

Regarding a wavelength for reproduction, and wavelength may be used if it is other than $\lambda_o$ which affords the identical reflection rate before and after recording.

The erasing wavelength $\lambda_e$ may be any wavelength if it is shorter than $\lambda_o$, but a value corresponding to the smallest reflection rate should desirably be selected because the absorption rate increases.

As described above in detail, according to the present invention, a novel substance is used for a recording medium, and an optical information apparatus and a writing and erasing method which are suited to the substance can be provided.

Figure 10:
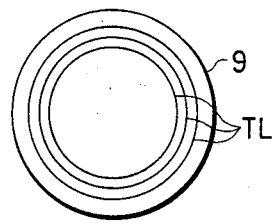
FIG. 10 is an explanatory view of the track lines of a recording medium in the present invention.
Figure 11:
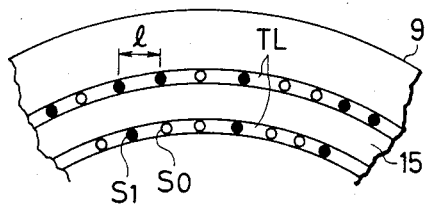
FIG. 11 is an explanatory view of the recorded states of information signals in the track lines.

Referring to FIG. 10, the disc 9 is formed with track lines TL beforehand. Here, the track lines TL are indicated by a set of lines in the shape of concentric circles. However, they may well be spiral. The recording medium 9 is a disc made of, for example, an alloy having an intercrystalline phase transition property, an amorphous alloy, or an optomagnetic substance. FIG. 11 shows parts of the track lines TL in FIG. 10 on enlarged scale. Symbols S1 and S0 denote signal pits, and signals recorded at suitable intervals l on the track lines are exemplified. Assuming that the illustrated signal pits S1 blacked out indicate the high level "1" of binary signals, the portions expressed by the symbol S0 signify the low level "0" of the signals. It is assumed that the high level signal S1 correspond to a written state, while the low level signal S0 correspond to an unwritten state. That is, as understood from the later description, the track lines in the unwritten state are previously drawn on the recording medium 9 which is put into the written state over the whole surface.

This is based on the fact that the spectral reflection rate of the alloy forming the recording medium 9 exhibits the characteristics as shown in FIG. 3 at the wavelengths, approximately 780–840 nm of a semiconductor laser which is employed as a light source. More specifically, since the reflection rate of the recording medium in the unwritten state is lower than that of the recording medium in the written state, the power of the light source may be of a low level in order to change the unwritten state into the written state, and information can be readily written. Therefore, the illustrated measure is effective for high-speed recording.

However, when an argon gas laser or the like emitting a short wavelength (for example, 460 nm) is employed as the light source, the above relation between the unwritten state and the written state reverses. Hereunder, description will be made under the condition that the light source such as the semiconductor laser emitting wavelengths near 800 nm is employed.

Accordingly, parts of the track lines are used as recording spaces so as to bring the unwritten state into the written state only at the signals of the high level. In addition, since the signals of the low level may be left intact in the state of the track lines, a signal recording speed need not be lowered. Of course, in case of a recording medium with which the reflection rate of the unwritten state is higher than that of the written state contrariwise to the reflection rates shown in FIG. 3, stable and high-speed responses are attained in such a way that the recording medium 9 is set at the higher reflection rate in advance and that the high and low levels and the method of writing the signal of the track line are reversed to the foregoing.

Figure 12A:
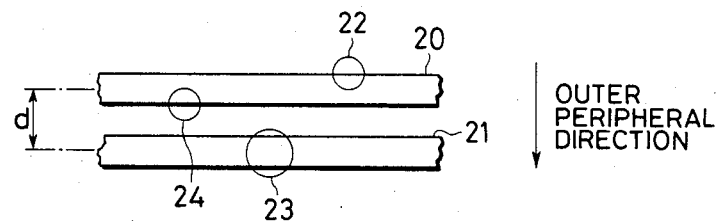
FIGS. 12A and 12B are explanatory diagrams of a tracking control system in the present invention.
Figure 12B:
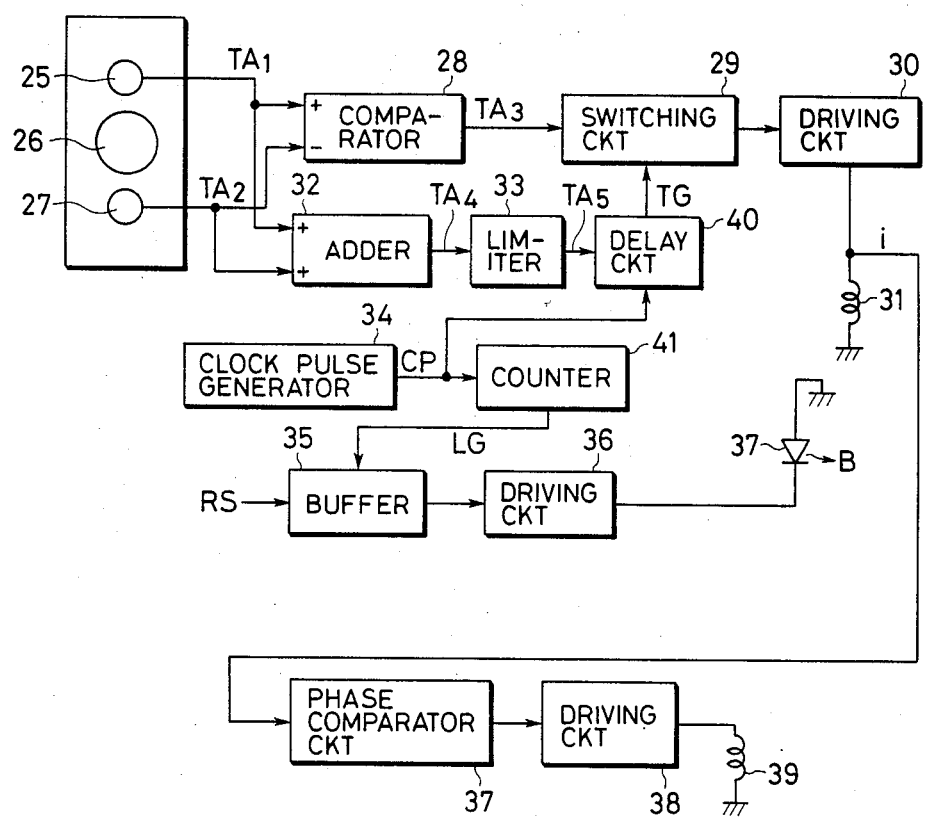

FIGS. 12A and 12B serve to explain a tracking control and tracking systems in reading and erasing modes in an embodiment of the present invention.

Figure 13A:
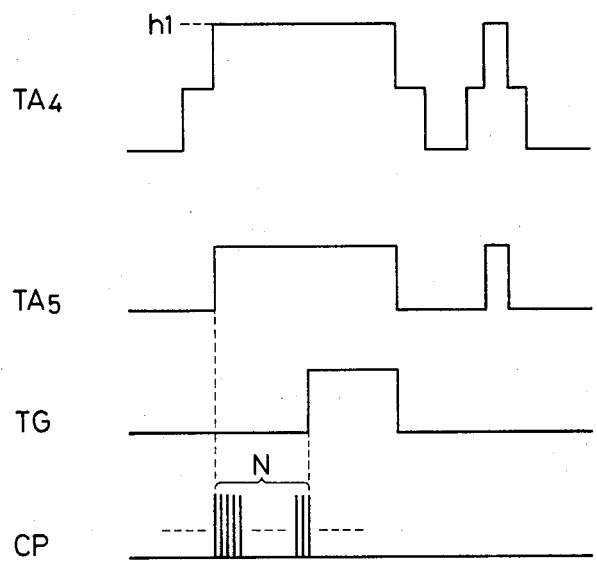
FIGS. 13A and 13B are explanatory diagrams of signals in the tracking control system of the present invention.
Figure 13B:
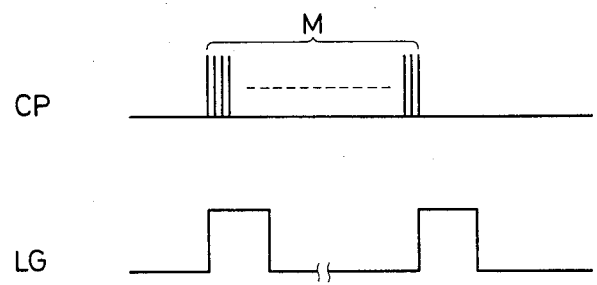

FIGS. 13A and 13B are diagrams for explaining signals during the tracking control of the embodiment of the present invention. Now, the embodiment will be described with reference to FIGS. 12A to 13B.

In FIG. 12A, numerals 20 and 21 indicate the shapes of track lines on a disc, numerals 22 and 24 indicate the shapes of tracking beam spots projected on the disc, and numeral 23 indicates the shape of a signal detecting and information writing beam spot projected on the disc. In this manner, the tracking beam spots 22 and 24 illuminate the inner and outer peripheral tracks with a distance d from the signal detecting and writing beam spot 23. Therefore, in case of writing information on the disc in the unwritten state, the tracking control is performed on the basis of the written track lines 20 and 21 in succession. Accordingly, the track pitch is stipulated by the beam spacing d, and the writing is stably executed at high density.

The above tracking control is carried out as follows. In FIG. 12B, numerals 25 and 27 designate sensors which detect the reflected lights of the tracking beam spots 22 and 24 from the disc, and the outputs TA1 and TA2 of which are set as stated below. When the tracking beam spots 22 and 24 lie on tracking control spots with equal areas and the signal detecting and writing beam spot 23 lies centrally of the track, the tracking detection outputs TA1 and TA2 become equal, and when the tracking beam spots 22 and 24 deviate, the tracking detection outputs TA1 and TA2 become unbalanced, whereby the tracking deviation can be detected.

The tracking detection outputs TA1 and TA2 are applied to a comparator 28, the output tracking control signal TA3 of which is applied to a driving circuit 30 via a switching circuit 29. Current i flows through the coil 31 of an actuator for driving an objective, in accordance with the tracking control signal TA3. Thus, the tracking control is performed. Besides, the current i is passed through a phase compensation circuit 37, whereupon only the low frequency component thereof is applied to a driving circuit 38. The coil 39 of an actuator for feeding an optical head is moved radially of the disc in accordance with the low frequency component of the tracking control signal. Thus, the tracking control is performed.

The tracking detection outputs TA1 and TA2 are also applied to an adder 32, the output of which reaches a level h1 indicated at TA4 in FIG. 13A during the tracking detection. The adder output is applied to a limiter 33, and when its input has reached h1, this limiter delivers a 'high' output, which becomes a waveform as shown at TA5 in FIG. 13B. This tracking detection output TA5 is applied to a delay circuit 40. The delay circuit 40 is also supplied with clock pulses CP from a clock pulse generator 34, and it is so set that its output becomes the high level after it has counted N clock pulses CP. Accordingly, a track gate signal TG being the output of the delay circuit 40 becomes as shown in FIG. 13A. The track gate signal TG is applied to the switching circuit 29 of the above tracking control circuit. Only when the track gate signal TG is at the high level, this switching circuit 29 transmits the tracking control signal TA3 to the driving circuit 30. Therefore, only when the tracking beam spot is projected on the track line for the tracking control, the tracking control is performed.

When the length of the spot for information is previously set shorter than a spot length which is determined by the count number N of the clock pulses CP, a stable tracking control is effected without erroneously detecting the informational spot as the tracking control spot. In particular, in the present invention, the long track lines are recorded beforehand, so that the detection of the informational spots is easy. Especially in a case where the tracking control is performed in reliance on signals of high frequency, spots for the tracking control may well be recorded on the track lines. In recording the tracking control spots, a recording signal RS is applied to a buffer 35, a laser driving signal is transmitted from the buffer 35 to a driving circuit 36, and a semiconductor laser 37' emits a light beam B in response to the laser driving signal, whereby information is written on the disc. In this case, a counter 41 is used which counts M clock pulses CP to provide a laser gate signal LG every M-th clock pulse CP as shown in FIG. 13B, and this laser gate signal LG is applied to the buffer 35. When the laser gate signal LG is at the high level, the buffer 35 stops delivering the information signal and delivers the high level, whereupon the semiconductor laser 37' emits the light beam B to write the tracking control spot on the disc.

While, in the above, the present invention has been described as recording the information signals and the tracking signals on the track lines, the space 15 between the track lines as shown in FIG. 11 may well be used for signals for the tracking controls.

As described above, according to the present invention, a recording medium need not be provided with grooves, rugged parts, etc. for tracking, which is economical and simplifies an apparatus.

Moreover, information signals are written, read and erased with track lines held in an unwritten state, so that high-speed response can be precisely attained.

Figure 14:
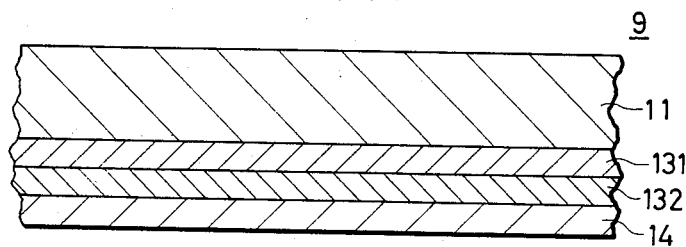
FIG. 14 is a view of another example of construction of a disc for use in the present invention.

Referring to FIG. 14, a disc 9 has a multilayer structure which has a first recording medium 131 on at least one surface of a transparent substrate 11 made of glass or an alloy or resin, and a second recording medium 132 on one surface of the recording medium 131. For some intended purposes, a protective film 14 is provided on one surface of the second recording medium 132. It is a matter of course that, in practical use, an antireflection film and a heat absorbing film for enhancing an efficiency during energy irradiation, stress relaxation films for relaxing the stresses and distortions of the recording films 131 and 132, and so forth are added to the aforementioned layers as may be needed.

Although the example in which the layers are formed on one side has been illustrated in the figure, it can be readily amplified to both sides.

Figure 15:
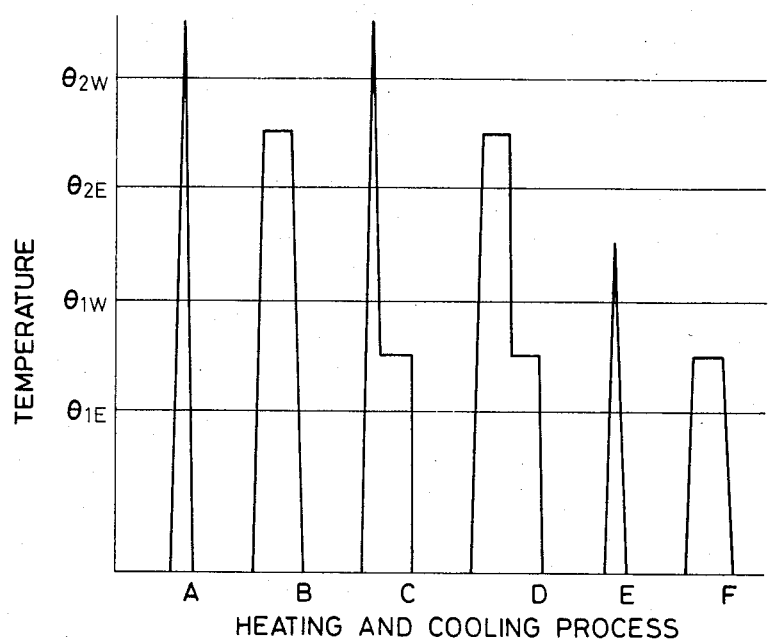
FIGS. 15–17 are views each elucidating a heating and cooling process for altering the recorded state of the disc shown in FIG. 14.

FIG. 15 shows a heating and cooling process for changing the states of the first and second recording layers under a condition $\theta_{2W} > \theta_{2E} > \theta_{1W} > \theta_{1W}$ where $\theta_{1W}$ and $\theta_{1E}$ denote the transformation temperatures of the first recording medium 131 and $\theta_{2W}$ and $\theta_{2E}$ denote the transformation temperatures of the second recording medium 132. When the state of the first recording layer by heating and rapid cooling is denoted by 1a, the state thereof by gradual cooling is denoted by 1b, the state of the second recording layer by heating and rapid cooling is denoted by 2a and the state thereof by gradual cooling is denoted by 2b, the states of the two recording films are the following four:

$$A: \begin{pmatrix} 1a \\ 2a \end{pmatrix}$$

$$B: \begin{pmatrix} 1a \\ 2b \end{pmatrix}$$

$$C: \begin{pmatrix} 1b \\ 2a \end{pmatrix}$$

$$D: \begin{pmatrix} 1b \\ 2b \end{pmatrix}$$

While the basic states are indicated by the above four states, states E and F exist according to certain methods of heating and cooling. In these cases, only the content of the first recording layer changes with the content of the second recording layer remaining unchanged:

$$\left. \begin{matrix} E: \begin{pmatrix} 1a \\ * \end{pmatrix} \\ F: \begin{pmatrix} 1b \\ * \end{pmatrix} \end{matrix} \right\} \quad *: \text{No change of content.}$$

FIG. 15 illustrates methods of establishing the states A-F, which are as follows:

A: The recording layers have their temperatures raised to or above $\theta_{2W}$ and are rapidly cooled, whereupon they fall into the states 1a and 2a.

B: The recording layers have their temperatures held between $\theta_{2W}$ and $\theta_{2E}$ and are thereafter cooled rapidly, whereupon the first recording layer falls into the state 1a and the second recording layer into the state 2b.

C: The temperatures of the recording layers are once raised to or above $\theta_{2W}$, are rapidly lowered and are further held between $\theta_{1W}$ and $\theta_{1E}$, whereupon the first recording layer falls into the state 1b and the second recording layer falls into the state 2a.

D: The temperatures of the recording layers are held between $\theta_{2W}$ and $\theta_{2E}$ and are further held between $\theta_{1W}$ and $\theta_{1E}$, whereupon the first and second recording layers fall into the states 1b and 2b respectively.

E: The temperatures of the recording layers are raised into a point between $\theta_{2W}$ and $\theta_{1W}$ and are rapidly lowered, whereupon the first recording layer falls into the state 1a, but the state of the second recording layer is held.

F: The temperatures of the recording layers are held between $\theta_{1W}$ and $\theta_{1E}$, whereupon the first recording layer falls into the state 1b, but the state of the second recording layer is held.

A recording medium for establishing such states may be made of intercrystalline transition alloys or amorphous semiconductors with which the erasing temperature $\theta_{2E}$ of the second recording layer is higher than the writing temperature $\theta_{1W}$ of the first recording layer. It can be realized by selecting, e.g., an Ag-Zn alloy ($\theta_{1W} \approx 300°$ C., $\theta_{1E} \approx 150°$ C.) for the first recording layer and selecting, e.g., Cu-In-Al ($\theta_{2W} \approx 590°$ C., $\theta_{2E} \approx 510°$ C.) for the second recording layer.

Figure 16:
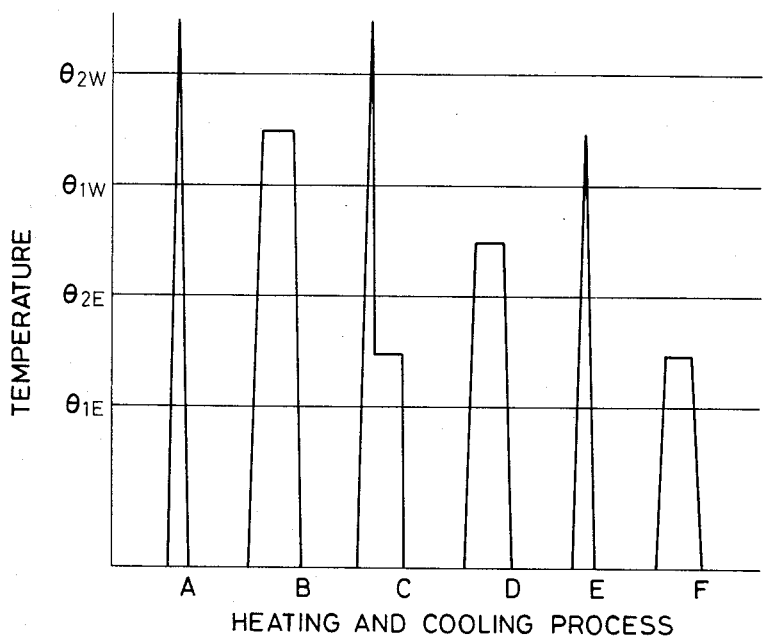

FIG. 16 illustrates a heating and cooling process in the case of $\theta_{1W} > \theta_{2E}$. Also in this case, the states A-F can be established. Herein, however, $\theta_{1W} > \theta_{2E}$ holds, so that when Ag-Zn is selected for the first recording layer, a medium of $\theta_{2E} < \theta_{1W} \approx 300°$ C. such as Ag-Al-Cu ($\theta_{2W} \approx 550°$ C., $\theta_{2E} \approx 220°$ C.) is used for the second recording layer.

Figure 17:
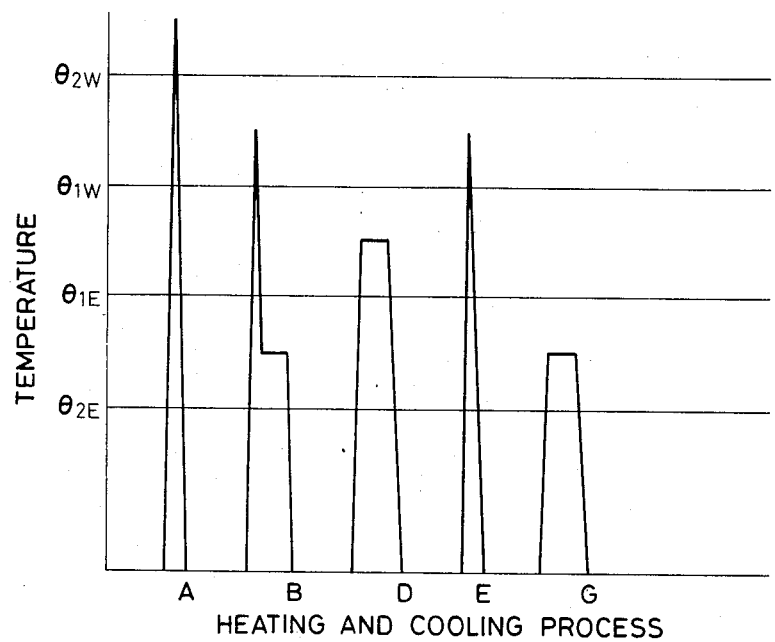

FIG. 17 corresponds to a case of $\theta_{2W} > \theta_{1W} > \theta_{1E} > \theta_{2E}$. The points of difference from the foregoing are that the states C and F cannot be established and that a state G is possible under which only the content of the second recording layer is put into the state 2b. In this case, when Ag-Zn, for example, is used for the first recording layer, an Au-Al alloy ($\theta_{2W} \approx 535°$ C., $\theta_{2E} \approx 125°$ C.) may be selected for the second recording layer.

Although the examples employing Ag-Zn for the first recording layer have been mentioned above, other alloys or amorphous semiconductor substances may well be selected. By way of example, when a mixture whose principal ingredient is $TeO_x$ and which contains Sn and Ge ($\theta_{1W} \approx 280°$ C., $\theta_{1E} \approx 120°$ C.) is selected for the first recording layer and an alloy of $\theta_{2E} > \theta_{1W}$ such as the aforementioned Cu-In-Al or Cu-Al-Ni ($\theta_{2W} \approx 725°$ C., $\theta_{2E} \approx 350°$ C.) is selected for the second recording layer, the states A-F in FIG. 16 can be established. It is the basic idea to select recording media of unequal phase change or intercrystalline transition temperatures.

Figure 18:
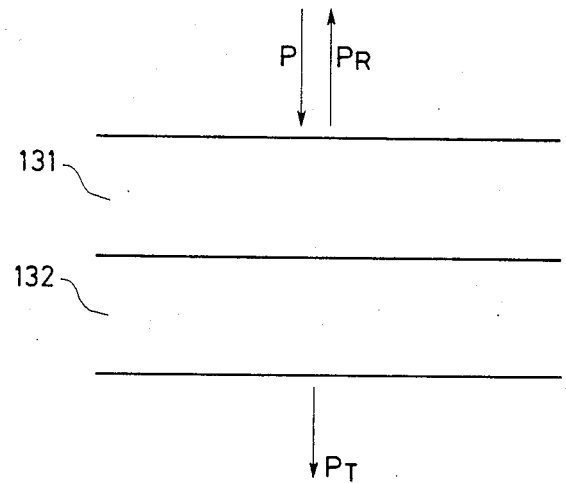
FIG. 18 is a diagram elucidating a principle for reproducing the disc shown in FIG. 14.

Next, a method of reading signals thus written will be described. When the reflection rate of each recording medium is denoted by $R_i$ (i=1, 2: Nos. of the recording layers) and the permeability rate by $T_i$ (i=1, 2) and when light of intensity P is projected as shown in FIG. 18, the intensities $P_R$ and $P_T$ of reflected light and transmitted light are indicated by the following equations:

$$P_R = P\{R_1 + (1-R_1)T_1^2 R_2\} \tag{5}$$

$$P_T = P(1-R_1)T_1(1-R_2)T_2 \tag{6}$$

These intensities $P_R$ and $P_T$ assume four values, depending upon the states of the respective recording layers, and the written signals can be read owing to the differences.

Now, examples of application of the present invention will be explained.

A. In case of using two recording films 131, 132 as multiple-valued memory:

When note is taken of the intensity of the reflected light (the same concept applies to the transmitted light), the states A-D mentioned before are indicated as follows in accordance with Eq. (5):

$$P_{RA} = P\{R_{1a} + (1-R_{1a})T_{1a}^2 R_{2a}\} \quad (7)$$

$$P_{RB} = P\{R_{1a} + (1-R_{1a})T_{1a}^2 R_{2b}\} \quad (8)$$

$$P_{RC} = P\{R_{1b} + (1-R_{1b})T_{1b}^2 R_{2a}\} \quad (9)$$

$$P_{RD} = P\{R_{1b} + (1-R_{1b})T_{1b}^2 R_{2b}\} \quad (10)$$

(7)-(10) indicate the differences of the contents of the recording layers, and the states A-D can be identified merely by monitoring the quantities of the reflection light. Next, a writing method will be explained. Conceptually the method illustrated in FIG. 15 or FIG. 16 can be used for the writing, but it is difficult of practicable realization. Therefore, a two-stage writing system is used here. This system is a method in which the higher-temperature recording medium is first subjected to writing, followed by the writing of the lower-temperature recording medium. Concretely, it is a method in which two heads are utilized for simultaneous writing or a method in which a single head is used for writing twice. Since a method which writes information while erasing information simultaneously is the same, this method will be e plained here with reference to FIG. 19.

Figure 19:
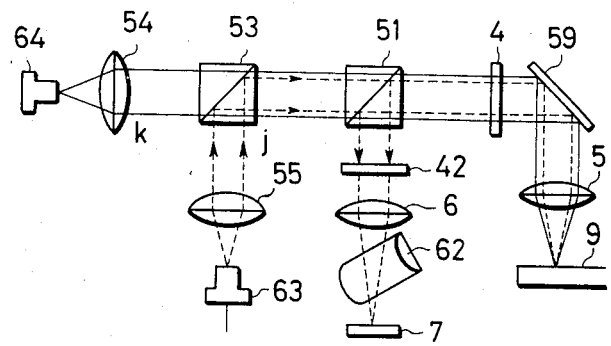
FIG. 19 is a diagram of an embodiment of an optical system which is applicable to the present invention.
Figure 20:
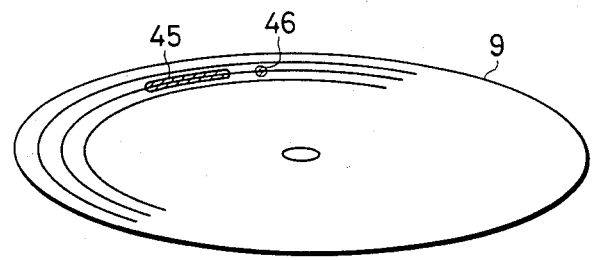
FIG. 20 is an explanatory view of beam shapes on a disc surface.

In FIG. 19, divergent beams emitted from semiconductor lasers 63 and 64 are respectively turned into collimated beams j and k by collimator lenses 55 and 54. Here, it assumed that the semiconductor laser 64 be used for writing and reading, while the semiconductor laser 63 be used for erasing. Then, the collimated beam k passes through an optical synthesizer 53, and it passes substantially centrally of an objective 5 via a polarizing beam splitter 51, a λ/4 plate 4 and a mirror 59, to form a substantially circular light spot at the center of the recording line of a disc 9. On the other hand, the collimated beam j is diverted by 90 degrees by means of the optical synthesizer 53, and it travels similarly to the collimated beam k through the polarizing beam splitter 51, et seq. However, it takes an optical path according to which a light spot is formed at a position deviating by a minute distance Δl with respect to the recording line of the disc 9. Although the example employing the collimated beam k for writing and reading and the collimated beam j for erasing has been illustrated here, they may well be exchanged. More in detail, a shaping prism by which the elliptical shape of the light spot of the semiconductor laser is put into a substantially circular shape is disposed in the writing and reading optical path, while a shaping prism by which the ellipse of the light spot of the semiconductor laser is further expanded into a long ellipse is disposed in the erasing optical path. Owing to the optical system described above, a long elliptical spot 45 and a substantially circular spot 46 shown in FIG. 20 can be formed on the surface of the disc 9. Since the disc surface is once heated to and held at an erasing temperature by the long elliptical spot 45, data and information in the irradiated area are erased. After erasing the data and information in this manner, the substantially circular spot 46 is modulated in accordance with the pattern of data or information, whereby new information can be recorded.

Light reflected by the disc 9 passes via the objective 5, mirror 59 and λ/4 plate 4, it is diverted by the polarizing beam splitter 51, and it reaches a photodetector 7 through a coupling lens 6 as well as a cylindrical lens 62. Servo signals for the control of the distance between the objective and the disc, namely, focusing and for the control of the light spot in the track direction of the disc, namely, tracking can be obtained under the focusing state of the photodetector. This detecting system is provided with a filter 42 for intercepting reflected light based on the erasing beam j, to prevent disturbance from entering the photodetector.

Figure 21:
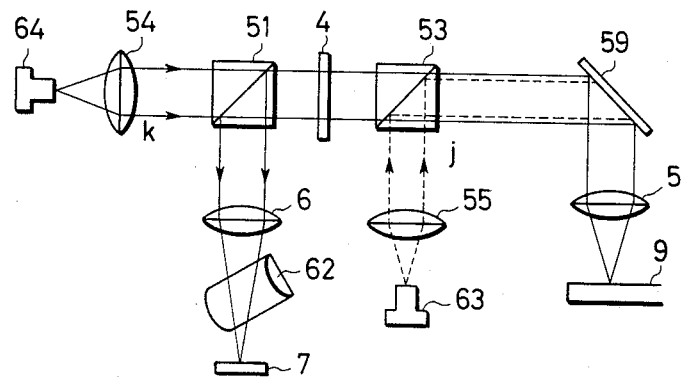
FIG. 21 is a diagram of another embodiment of the optical system applicable to the present invention.

FIG. 21 shows a substitute for the optical system, which is quite the same except that the position of the optical synthesizer 53 is set between the ¼-wavelength plate 4 and the mirror 59. In this case, it is the feature that the filter 42 required in the system of FIG. 19 is dispensed with.

B. In case of utilizing one of two recording films 131, 132 as a memory for permanent writing and the other as a memory for rewriting:

Regarding discs in an electronic file etc., a single disc should desirably include therein ① a rewritable region for writing information and ② permanent writing regions such as index and address regions and a writing region for important information.

Each of discs hitherto known, however, is capable of only either permanent recording or rewritable recording. In consequence, various inconveniences have arisen including that important information is erroneously erased or that to the contrary, due to the impossibility of the rewriting of the information, a new area of the disc is required each time information is rewritten.

In compliance with such a request, the present invention can readily realize the permanent recording and the rewritable recording with a single disc. The recording material on the higher temperature side in FIG. 15 or FIG. 16 may be used for the permanent recording, and the material on the lower temperature side for the rewritable recording. For example, in the case of FIG. 15, the permanent recording is performed with the pattern A, and the recording is erased by utilizing the patterns E and F. As an optical system, the optical system in FIG. 19 or FIG. 21 can be utilized. Alternatively, an optical system exclusively for recording (one wherein the laser 63 is removed from the arrangement of FIG. 19).

Figure 22:
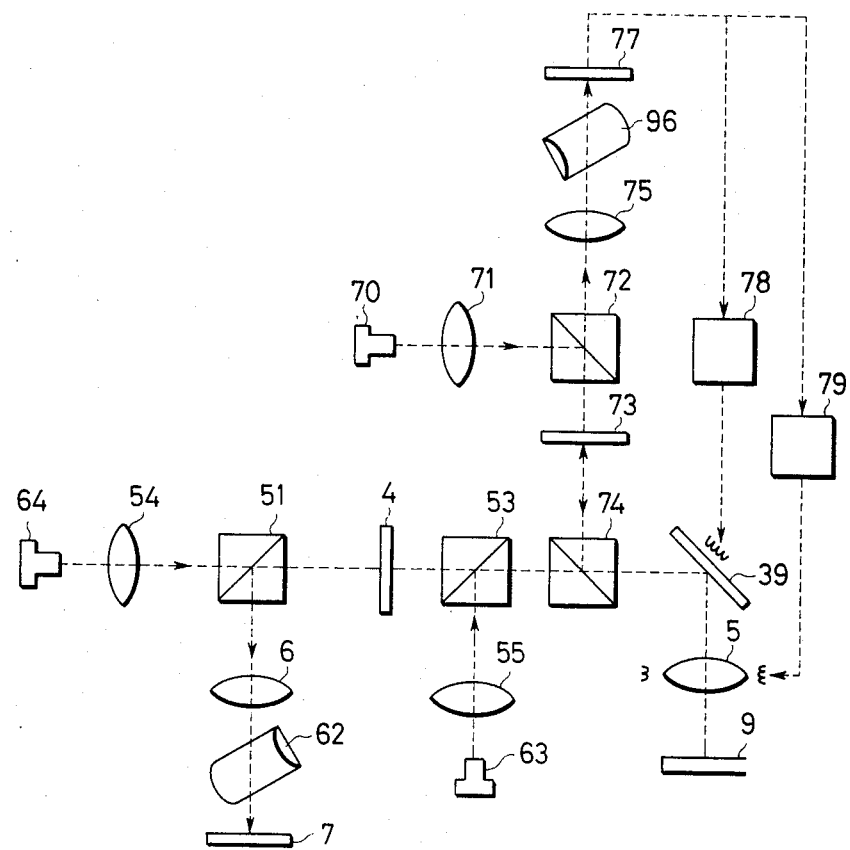
FIG. 22 is a diagram of an embodiment of a stereo type optical system.

Using one recording layer as a permanent recording memory and the other recording layer as a rewritable memory, it becomes possible to utilize the signals of the one recording layer for autofocusing and tracking. An embodiment therefor is shown in FIG. 22. The same symbols as in FIG. 21 indicate identical or corresponding portions. The present embodiment is such that constituents of numerals 70 to 79 are added to the arrangement of FIG. 21. It is intended for the permanent recording and the erasing thereof. Now, the operation of the embodiment will be described. Light emitted from a laser 70 is turned by a lens 71 into a collimated beam, which is diverted by 90 degrees by means of a polarizing beam splitter 72. Vai a ¼-wavelength plage 73, the beam joins the rewritable recording optical system in an optical synthesizer 74, whereupon it reaches the disc 9. Subsequently, light reflected by the disc 9 passes through the beam splitter 72 and is detected by a sensor 77 via lenses 75 and 76. This sensor 77 reads the signal of the disc surface, and it simultaneously reads a deviation signal for tracking and an error signal for autofocusing, with which a tracking control 78 and an autofocusing control 79 function.

When such permanent recording is utilized as a track guide, an optical disc capable of writing and erasing without grooves can be fabricated.

Besides, when both the permanent recording memory and the rewritable memory are simultaneously reproduced, the apparatus can be used as a stereo.

According to the present invention, a plurality of recording layers of unequal phase change temperatures are provided, whereby a memory device of high packaging density can be realized.

What we claim is:

1. In an optical information apparatus wherein information signals are written on a recording medium and read and erased therefrom by the use of a light beam; an optical information apparatus characterized in that the recording medium includes at least one memory layer made of a metal or alloy which, when heated by the light beam, performs an intercrystalline phase transition between first and second crystal states thereof to write or erase information, and that the light beam is projected at a wavelength at which a reflection rate of light from said metal or alloy becomes larger than said metal or alloy is irradiated with an information writing light beam.

2. An optical information apparatus according to claim 1, wherein the light beam is projected at a wavelength at which the reflection rate of the light from said metal or alloy becomes larger when said metal or alloy is irradiated with an information erasing light beam.

3. An optical information apparatus according to claim 1, wherein the light beam includes a writing light beam having a longer wavelength with respect to a reference wavelength at which reflection rates become equal before and after the writing, and an erasing light beam having a shorter wavelength with respect to the reference wavelength.

4. An optical information apparatus according to claim 1, wherein the recording medium includes a plastic plate, a second layer including said at least one memory layer made of said metal or alloy having a writing function and which overlies said plastic plate, and a third layer which protects said second layer.

5. An optical information apparatus according to claim 4, wherein said first layer has an antireflection function.

6. An optical information apparatus according to claim 4, wherein said plastic plate is made of a material which is transparent to the light wavelength of a laser being an input heat source, and which has a thermal conductivity lower than that of the writing alloy layer of said second layer in order to prevent radiation of heat absorbed or accumulated in said first layer.

7. An optical information apparatus according to claim 4, wherein said third layer is made of a material of small heat transfer coefficient in order to prevent thermal diffusion of said second layer in a horizontal direction.

8. An optical information apparatus according to claim 4, wherein thermal expansions of said plastic plate and said third layer are equal to or greater than those of said first layer and said second layer.

9. An optical information apparatus according to claim 1, wherein the recording medium comprises at least two memory layers of unequal phase transition temperatures, and said memory layers are irradiated with the light beam to change the crystal state of at said least one memory layer, thereby to write or erase information.

10. An optical information apparatus according to claim 9, wherein at least another of said memory layers is made of a memory semiconductor which exhibits a phase change between a crystal state and an amorphous state.

11. An optical information apparatus according to claim 1, further comprising a control circuit for controlling the light beam, which writes track lines for tracking on the recording medium so as to write the information signals on the track lines.

12. An optical information apparatus according to claim 11, wherein said control circuit operates to satisfy at least one of a first condition under which a reflection rate of the recording medium for light becomes lower than a reflection rate of a part of the recording medium with the information signal written thereon, a second condition under which a heat absorption rate of the recording medium for the light becomes higher than a heat absorption rate of the information-signal written part, and a third condition under which a permeability rate of the recording medium for the light becomes lower than a permeability rate of the information-signal written part, and to establish a condition under which, when the first condition, the second condition and the third condition are comprehensively examined, to enable change of an efficiency of conversion from the light into heat to be higher in a part with the track line unwritten, than in the information written part.

13. An optical information apparatus according to claim 11, wherein said control circuit operates to convert the track lines into an unwritten state and a portion other than said track lines into a written state, the information signals being written on said track lines.

14. An optical information apparatus according to claim 11, wherein said control circuit operates to project the light beam into the track lines so as to write tracking spots.

15. An optical information apparatus according to claim 14, wherein said control circuit operates to project tracking signal light spots and information signal writing light spots on the track lines so as to write respective signals.

16. An optical information apparatus according to claim 15, wherein said control circuit operates to make the tracking signal writing spot longer than the information spot writing spot.

17. An optical information apparatus according to claim 1, wherein said control circuit operates to write the track lines concentrically or spirally in advance and to write the information signals with desired track line intervals.

18. An optical information apparatus according to claim 11, wherein said control circuit uses reflected light or transmitted light of a space between the track lines, as a signal for a tracking control which is performed by projecting a light beam.

19. In a method of writing and erasing optical information wherein information signals are optically written on a recording medium or read and erased therefrom by the use of a light beam; a method of writing and erasing optical information characterized in that the recording medium includes at least one memory layer made of a metal or alloy which, when heated by the light beam, performs an intercrystalline phase transition between first and second crystal states thereof to write or erase information, and that the light beam is projected at a wavelength at which a reflection rate of light from said metal or alloy becomes larger when said metal or alloy is irradiated with an information writing light beam.

20. A method of writing and erasing optical information according to claim 19, wherein the light beam is projected at a wavelength at which the reflection rate of the light from said metal or alloy becomes larger when said metal or alloy is irradiated with an information erasing light beam.

21. A method of writing and erasing optical information according to claim 19, wherein the light beam includes a writing light beam having a longer wavelength with respect to a reference wavelength at which reflection rates become equal before and after the writing, and an erasing light beam having a shorter wavelength with respect to the reference wavelengths.

* * * * *